(12) United States Patent
Nakamura

(10) Patent No.: US 7,018,313 B2
(45) Date of Patent: Mar. 28, 2006

(54) SPROCKET WITH WEAR LIMIT INDICATION

(75) Inventor: Kenichiro Nakamura, Kyoto (JP)

(73) Assignee: Tsubakimoto Sprocket Co., Kyoto (JP)

( * ) Notice: Subject to any disclaimer, the term of this patent is extended or adjusted under 35 U.S.C. 154(b) by 185 days.

(21) Appl. No.: 10/437,504

(22) Filed: May 14, 2003

(65) Prior Publication Data

US 2004/0002402 A1    Jan. 1, 2004

(30) Foreign Application Priority Data

Jun. 28, 2002 (JP) .............................. 2002-190418

(51) Int. Cl.
*F16H 55/30* (2006.01)

(52) U.S. Cl. ...................................... 474/152
(58) Field of Classification Search ................ 474/152, 474/156, 154, 174, 155, 175, 176
See application file for complete search history.

(56) References Cited

U.S. PATENT DOCUMENTS 5,348,515 A  *  9/1994  Miller ........................ 474/152
5,980,406 A  *  11/1999  Mott et al. ..................... 474/84

FOREIGN PATENT DOCUMENTS

JP          3-78153           8/1991
JP         05286316 A   *   11/1993

* cited by examiner

*Primary Examiner*—Vicky A. Johnson
(74) *Attorney, Agent, or Firm*—Howson and Howson

(57) ABSTRACT

In a sprocket for use with a roller chain, a wear limit marker, having a different color from that of the base material of the sprocket, is provided on side surface of a sprocket tooth adjacent to a keyway. The wear limit marker is disposed on an imaginary line extending in the direction of the pressure angle, and is located in a hole or groove provided in a side surface of the sprocket tooth. The marker makes it possible to determine easily and reliably whether or not wear at the location at which wear of a sprocket tooth proceeds most rapidly is within a predetermined limit, and the location of the marker makes it possible to evaluate wear conditions even when the sprocket is installed in a machine.

8 Claims, 5 Drawing Sheets

SPROCKET WITH WEAR LIMIT INDICATION

FIELD OF THE INVENTION

This invention relates to a sprocket for use with a roller chain, a bushing chain, or the like, and particularly to a sprocket having a wear limit indicator.

BACKGROUND OF THE INVENTION

In a chain drive, when a roller chain is in mesh with a sprocket to transmit power, wear is produced on the tooth surfaces of the sprocket, particularly as a result of sliding contact at the location where the sprocket meshes with the chain, as described in detail below.

Referring to FIG. 5 of the drawings, when a sprocket tooth 11 and chain roller 12 mesh with each other, contact usually occurs at a fixed contact position 13. At the contact position, a force F is applied by the roller 12 to the sprocket tooth surface 11a in a fixed direction. The force F acts along a direction 14, which corresponding to the pressure angle θ determined by the shape of the sprocket teeth.

The force F results in increased contact surface pressure at the contact position, and generates wear on the tooth 11 as a result of sliding contact both during meshing engagement of the roller with the sprocket tooth and during disengagement of the roller from the sprocket tooth. The wear of the sprocket tooth 11 progresses along the line of action, i.e., along the direction 14 corresponding to the pressure angle θ.

In a roller chain transmission, the pressure angle θ is usually defined as the angle formed between the chain pitch line 15 and a line 14 extending from the center of a roller 12 and perpendicular to the contact surface of the sprocket tooth, as shown in FIG. 6. The chain pitch line 15 intersects the pitch circle 15a of the sprocket at the locations of the centers of two successive rollers, as if the centers of both of the two successive rollers were on the pitch circle.

There is a limit to the amount of wear that a sprocket tooth can sustain while still being able to mesh smoothly with a roller chain. When the wear of the sprocket teeth exceeds this limit, the meshing of the sprocket and the chain is no longer smooth, and tooth defects are generated in the sprocket. Thus, it has been necessary to determine the wear limit of the sprocket.

To detect the extent of wear in a sprocket tooth, several methods have been used in the past. As shown in FIG. 7, a tooth form gauge D has been used. The gauge is brought into contact with the sprocket, and the gap between the tooth surface and the gauge is measured. Alternatively, the shape of the profile of a sprocket tooth is transferred onto paper by ink rubbing, so that the difference between the original tooth form and the current tooth form can be measured. Another method, as shown in FIG. 8, is to provide a concave groove 11b on each tooth surface 11a of the sprocket, so that the disappearance of the groove due to wear of the tooth surface can be observed visually (see Japanese Laid-Open Utility Model Publication No. Hei. 3-78153).

The use of a gauge for gap measurement, as shown in FIG. 7, is subject to several problems. Gap measurement requires visual observations, which may be made differently by different individuals, and may also be dependent on the particular measurement technology which is used. The sprocket is not always readily accessible. If it is hidden behind other machine components, tooth form gauge measurement may not be possible. Furthermore, it is always necessary to keep a tooth form gauge available for each different sprocket.

The ink-rubbing transfer method is subject to errors due to shift and elongation of the paper. Curvature of the tooth forms also prevents their shapes from being correctly transferred onto paper. Moreover, it is necessary to maintain a reference tooth form for measurement and determination of wear loss.

The use of a concave, wear-indicating groove is also subject to a number of problems. Since the groove is positioned on each chain-contacting tooth surfaces, it reduces the available contact area, thereby increasing the contact surface pressure and increasing the rate at which wear of the sprocket teeth progresses. Formation of the concave groove on the tooth surfaces is difficult and costly. A mixture of fats and oils and powder resulting from wear of the sprocket teeth and other components such as conveyor components, tends to accumulate in the groove, and must be removed for proper observation or measurement of the wear of the sprocket teeth. Finally, as in the case of the tooth form gauge, if the sprocket is hidden behind other machine components, the concave groove is difficult to see, and consequently the amount of wear is difficult to determine.

Accordingly, an object of the invention is to solve the above-mentioned prior art problems. More particularly, an object of the invention is to provide a sprocket with a wear limit indicator, which makes it possible to determine easily and reliably whether or not the wear conditions of the sprocket teeth are within the acceptable limit. It is also an object of the invention to make it possible to observe tooth wear conditions from a side of the sprocket, and to facilitate observation of wear in those cases where the sprocket is installed in a machine at a location at which it not readily accessible.

SUMMARY OF THE INVENTION

The sprocket in accordance with the invention has sprocket teeth disposed along an edge spaced radially from the sprocket's axis of rotation. These sprocket teeth have side surfaces disposed in transverse relationship to the direction of the axis of rotation. A wear limit marker disposed on a side surface of one of the sprocket teeth serves as a wear limit indicator for indicating whether or not the sprocket teeth have reached a predetermined wear limit.

Preferably, the wear limit marker is disposed on an imaginary line extending in the direction of the pressure angle. This imaginary line is perpendicular to the tooth face. In the case of a sprocket meshing with a roller chain, the imaginary line will extend from a point on the sprocket pitch line at which the center of a roller would be located when the roller is engaged with, and applying a force to, the sprocket tooth having the wear limit marker.

The sprocket tooth on the side of which the wear limit marker is disposed is preferably located adjacent a keyway for locking the sprocket to a shaft.

The sprocket is preferably composed of a base material having a first color, the wear limit marker has a second color different from the first color, and the wear limit marker is fitted into a groove or a hole provided on side surface of the sprocket teeth on which it is disposed.

Because the wear indicating means are provided on a side, or on the sides, of a sprocket tooth, it is easy to determine visually whether or not the wear of the sprocket has reached its limit. Moreover, the location of the wear indicating means on the side of a tooth enables the condition of the sprocket to be determined even when the sprocket is installed in a machine. Since the wear determination means is located along the direction of the pressure angle, where the wear of the sprocket tooth proceeds most rapidly, the condition of the sprocket can be determined visually before the occurrence of fracture of the sprocket teeth, and the useful life of the sprocket can be maximized by avoiding premature replacement of the sprocket. When the wear determination means is provided on a sprocket tooth adjacent a keyway, the position of the wear determination means can be readily determined. The difference between the colors of the wear determination means and the base material of the sprocket, and that fact that the wear determination means is fitted into a groove or a hole on a side surface of a sprocket tooth, ensures that the wear limit marker will not disappear and can be easily recognized, even if the side of the sprocket is worn. Moreover, even if the sprocket is located behind other machine components, the determination of wear conditions can be carried out easily.

DETAILED DESCRIPTION OF THE PREFERRED EMBODIMENTS

Figure 1:
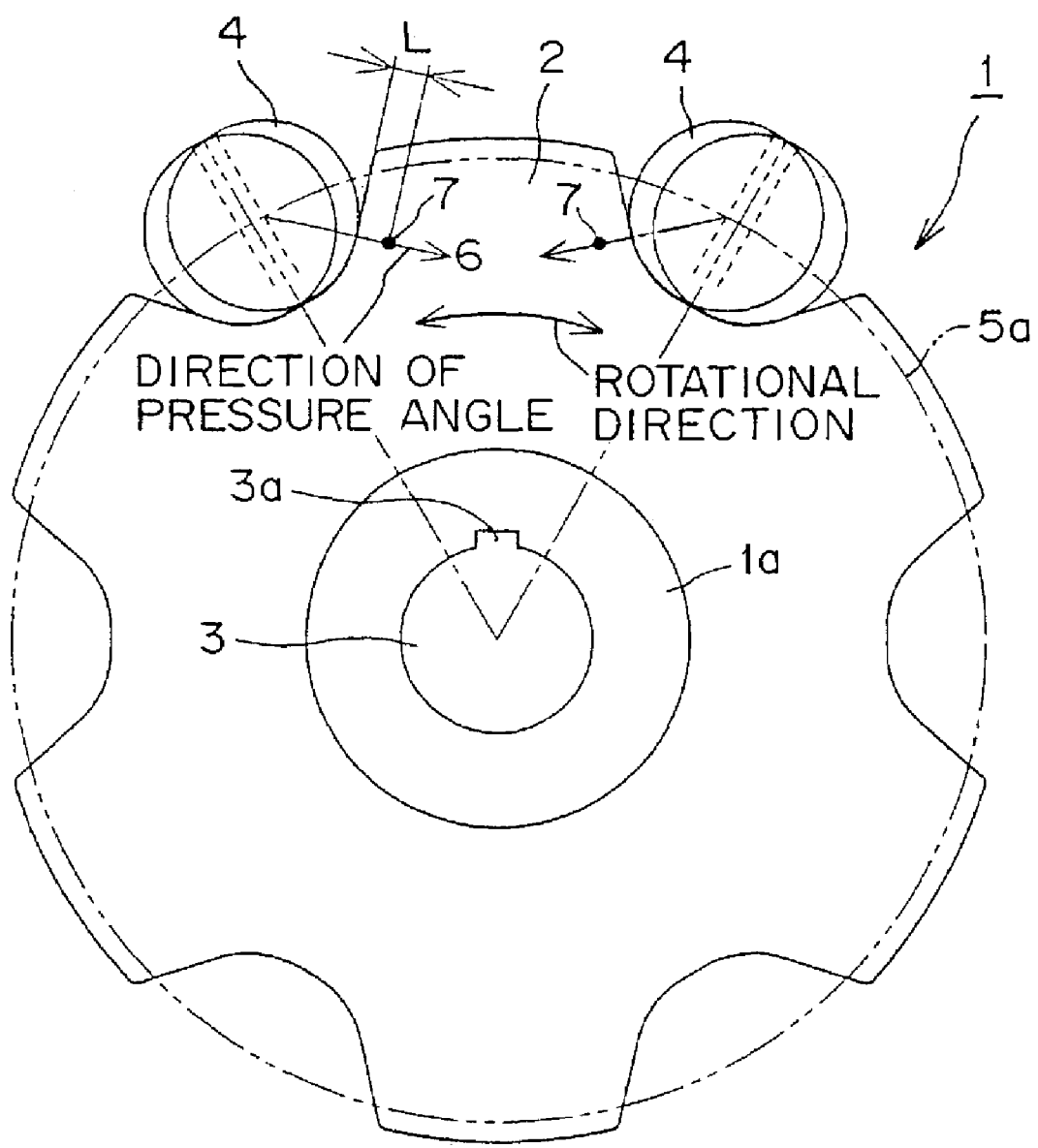
FIG. 1 is a front schematic view illustrating an example of the invention.
Figure 2:
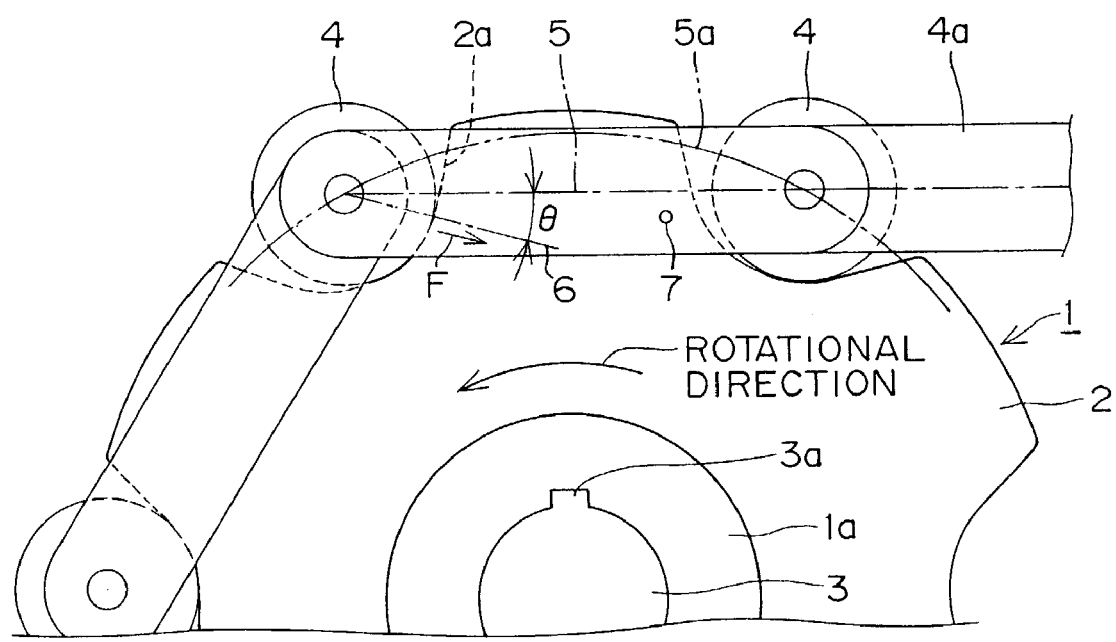
FIG. 2 is an enlarged view illustrating the meshing of a sprocket with a roller chain.

As shown in FIGS. 1 and 2, a sprocket 1 has teeth 2 on its outer circumference, and a central shaft hole 3 surrounded by a boss 1a. A keyway 3a is provided in the shaft hole 3. Rollers 4 in a roller chain are connected by plates 4a, shown in FIG. 2. A chain pitch line 5, shown in FIG. 2, extends from the center of a roller 4 to the center of a succeeding roller 4 in the chain. FIGS. 1 and 2 show a pitch circle 5a. $\theta$ denotes the pressure angle, and 6 denotes a direction of the pressure angle.

On a side surface of the tooth 2 positioned adjacent the keyway 3a, a wear limit marker 7, which serves as a wear determination means, is provided at a wear limit position in an area where the most wear occurs. The tooth on which the wear limit mark is located is preferably the tooth closest to the keyway, and preferably a tooth intersected by an imaginary radial line (not shown) extending from the axis of rotation of the sprocket through the keyway. The wear limit marker 7 is provided at the wear limit position, at a distance L from the tooth surface 2a along the pressure angle direction 6.

Since direction of rotation of the sprocket may be reversed, and since the sprocket may be a driving sprocket instead of a driven sprocket, the contact position between a sprocket tooth and a roller may be on either side of the tooth. Therefore, preferably, two wear markers 7 are provided, one on either side of the tooth, as shown in FIG. 1. Wear markers are also preferably provided on both sides of the sprocket so that sprocket tooth wear can be observed from either side. Thus, in a preferred embodiment, four wear markers are provided, two being on one side of the sprocket, as shown in FIG. 1, and two being provided on the opposite side of the sprocket.

The wear limit markers 7 are provided at positions corresponding to the wear limit distance L from the tooth surface, in the direction of the pressure angle (i.e., on the line of action of the force applied by to the tooth by the roller). The wear limit distance L is defined as follows. In the case of hardened sprocket, the sprocket is hardened to a certain depth from the surface by high frequency quenching or the like to improve the wear resistance of the sprocket. However, when wear extends beyond the hardened layer, it proceeds rapidly. The inner boundary of the hardened layer becomes the limit of wear and a distance corresponding to the effective hardening depth is the wear limit distance. In the case of a sprocket that is not hardened, the strength of the sprocket teeth deteriorates with wear, and the teeth tend to break. The depth of the wear of the teeth when fracture occurs is defined as the wear limit distance. This distance is determined by experiment.

Figure 3:
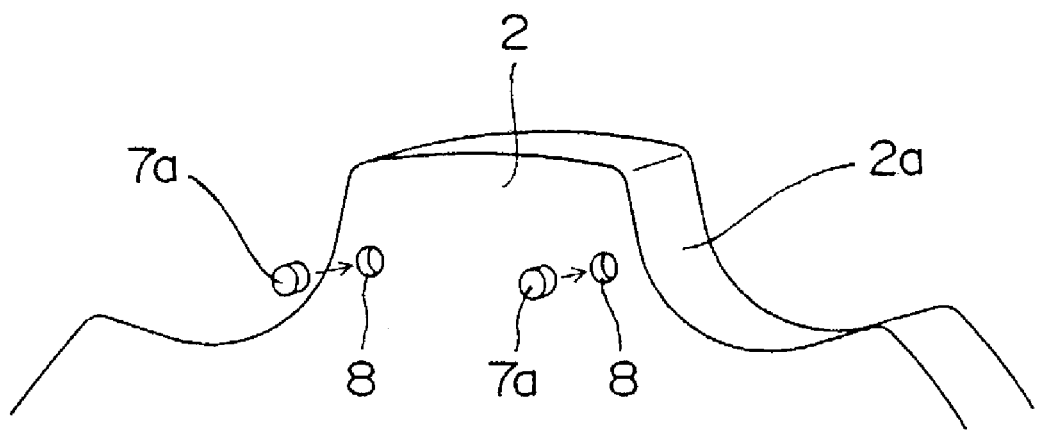
FIG. 3 is a fragmentary exploded view illustrating the mounting of a wear limit marker.
Figure 4:
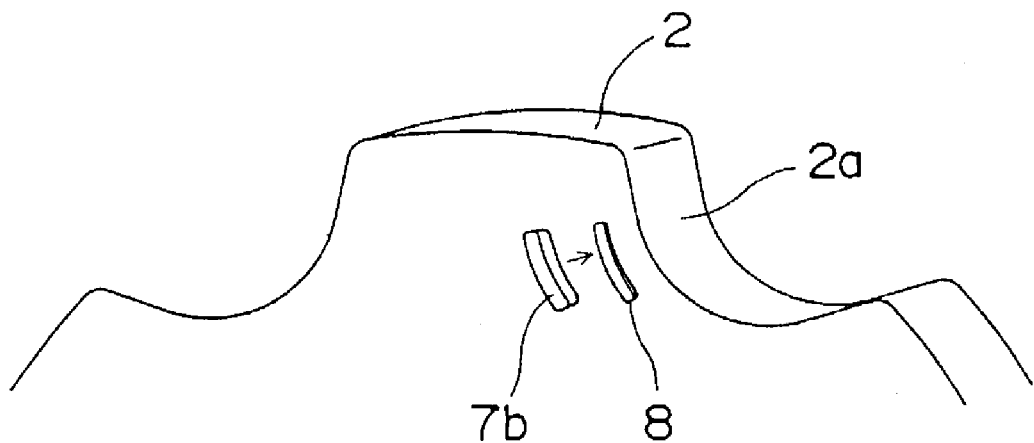
FIG. 4 is another fragmentary exploded view illustrating the mounting of an alternative form of wear limit marker.
Figure 5:
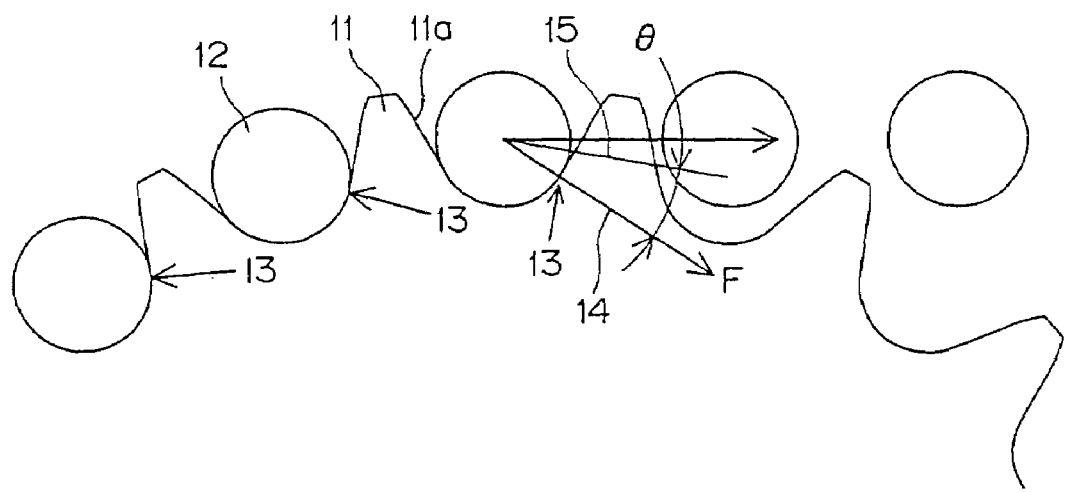
FIG. 5 is an explanatory view showing the contact of a roller with a sprocket tooth.
Figure 6:
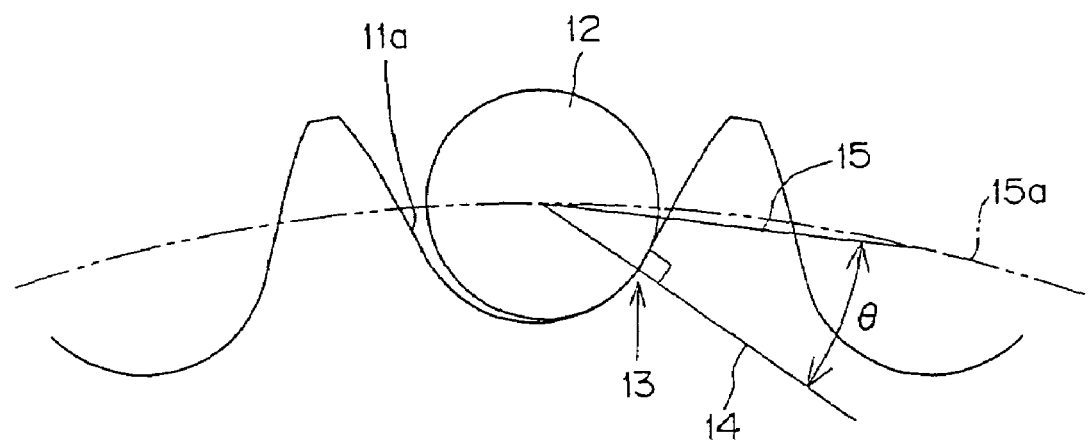
FIG. 6 is a schematic view illustrating the pressure angle in a sprocket used with a roller chain.
Figure 7:
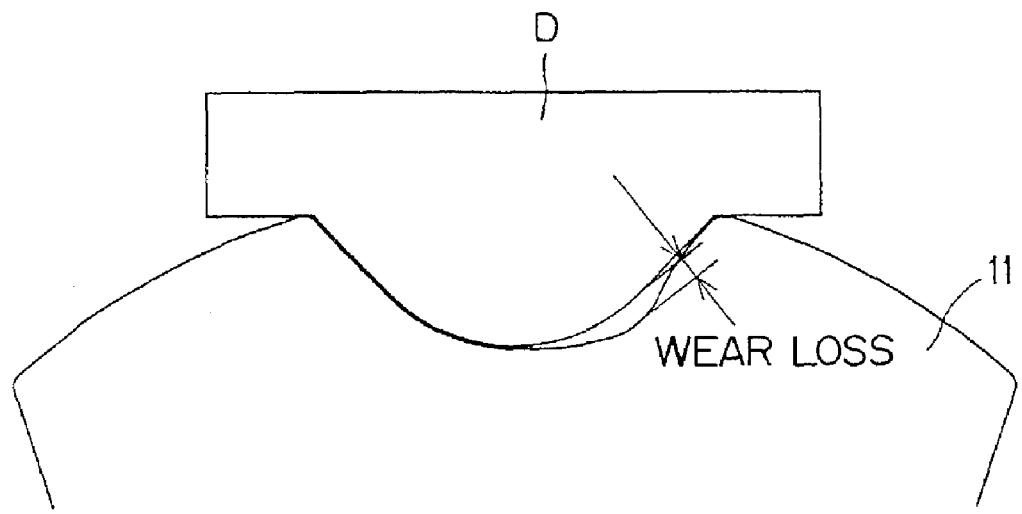
FIG. 7 is a schematic view showing how a tooth form gauge is used to measure wear of a sprocket tooth.
Figure 8:
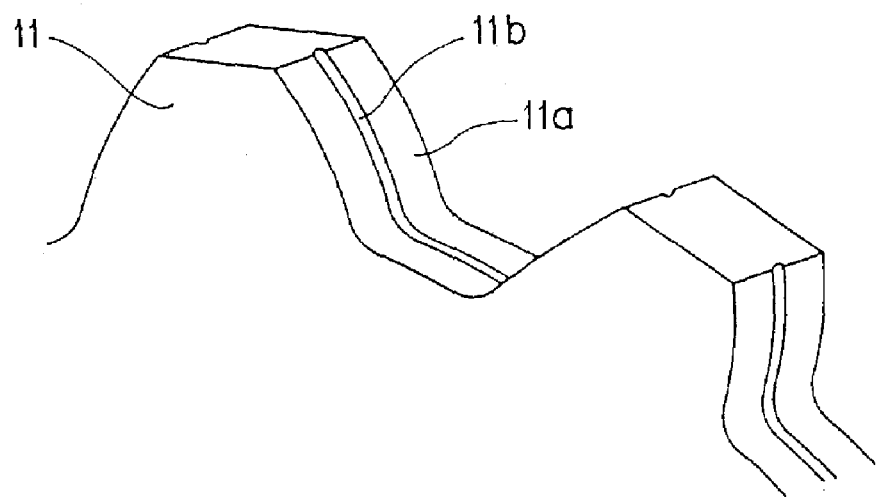
FIG. 8 is a fragmentary perspective view illustrating a wear-indicating groove on the surfaces of sprocket teeth.

The wear limit marker 7 can be a circular member 7a, as shown in FIG. 3, or a curved member 7b as shown in FIG. 4. The wear-limit marker may be formed of metal, non-ferrous metal, resin or the like, and preferably has a color different from that of the sprocket.

The wear limit marker 7 is fitted into a blind hole or groove 8 having a depth of a few millimeters in a side surface of a tooth 2 of the sprocket. Alternatively, the hole or groove can extend all the way through the sprocket. The wear limit marker is held in place by press-fitting, adhesion or the like so that it does not become dislodged from the sprocket.

It is preferable that the wear limit marker 7 be flush with the side surface of the sprocket. The wear limit markers 7 are not limited to the shapes illustrated in FIGS. 3 and 4, and may have any of a wide variety of shapes, such as an oval shape, a polygonal shape, an oxbow shape, and the like. When the wear limit marker 7 is made of metal it may be composed of a metal such as brass, stainless steel or the like, having a color different from that of the sprocket base material.

With the markers 7 at wear limit positions along the direction 6 of pressure angle, where wear of the tooth proceeds most rapidly, it is easy to determine reliably whether or not the sprocket teeth have reached their wear limit by observing the sprocket from the side. Moreover, since the wear limit markers 7 are provided on the sides of the sprocket teeth, even if the sprocket is located behind other machine components, the wear limit markers 7 can be readily observed. Locating the wear limit markers 7 on the side surfaces of a tooth adjacent the sprocket keyway makes it easy to locate them. Furthermore, since the wear limit markers have a color different from that of the base material of the sprocket, and are fitted into grooves or holes in the side surfaces of the sprocket, even if the side surface of the sprocket is worn, the wear limit markers can be easily recognized visually.

Although in the preferred examples of the wear determination means described above, wear limit markers are fitted into grooves or holes in side surfaces of the sprocket teeth, the wear determination means may be constituted by grooves or holes, or the wear limits may be indicated by painting side surfaces of the sprocket teeth in a color different from that of the base material of the sprocket.

The principal advantages of the invention may be summarized as follows. First, because the wear indicating means are provided on a side, or on the sides, of a sprocket tooth, it can easily be determined visually whether or not the wear of the sprocket has reached its limit, and the condition of the sprocket can be determined even when the sprocket is installed in a machine. Second, because the wear determination means is located along the direction of the pressure angle, where the wear of the sprocket tooth proceeds most rapidly, the condition of the sprocket can be determined visually before the occurrence of fracture of the sprocket teeth. Third, if the wear determination means is provided on a sprocket tooth adjacent a keyway provided in a shaft hole of the sprocket, the position of the wear determination means can be readily determined. Finally, if the wear limit marker having a different color from that of the base material of the sprocket is fitted into a groove or a hole on a side surface of a sprocket tooth, even if a surface of the sprocket 1 becomes worn, the wear limit marker will not disappear, and can be easily recognized visually because of the difference between the color of the marker and the color of the base material of the sprocket. Moreover, even if the sprocket is located behind other machine components, determination of wear conditions can be carried out easily.

I claim:

1. A sprocket having an axis of rotation, sprocket teeth disposed along an edge of the sprocket, said sprocket teeth being spaced radially from said axis of rotation and circumferentially from one another, said sprocket teeth having side surfaces disposed in transverse relationship to the direction of said axis of rotation, and each of said sprocket teeth having a pair of chain roller-engaging surfaces on opposite faces of the tooth with respect to the circumferential direction of the sprocket, and a pair of discrete wear limit markers, on a side surface of one of said sprocket teeth, for indicating whether or not the sprocket teeth have reached a predetermined wear limit, said markers being located adjacent, but spaced inwardly from, the respective chain roller-engaging surfaces on said one of the sprocket teeth, each said wear limit marker being disposed on an imaginary line extending in the direction of the pressure angle from a point on the sprocket pitch line at which the center of a chain roller would be located when said chain roller is engaged with, and applying a force to, said one of the sprocket teeth, and each said wear limit marker extending to predetermined limits on both sides of the imaginary line on which it is disposed.

2. A sprocket according to claim 1, in which only one of said teeth of the sprocket is provided with wear limit markers.

3. A sprocket according to claim 2, in which said sprocket has a shaft hole on said axis of rotation, said shaft hole has a keyway for locking said sprocket to a shaft extending into said shaft hole, and said one of the sprocket teeth is a tooth adjacent said keyway.

4. A sprocket according to claim 1, in which said sprocket has a shaft hole on said axis of rotation, said shaft hole has a keyway for locking said sprocket to a shaft extending into said shaft hole, and said one of the sprocket teeth is a tooth adjacent said keyway.

5. A sprocket having an axis of rotation, sprocket teeth disposed along an edge of the sprocket, said sprocket teeth being spaced radially from said axis of rotation and circumferentially from one another, said sprocket teeth having opposite side surfaces disposed in transverse relationship to the direction of said axis of rotation, and each of said sprocket teeth having a pair of chain roller-engaging surfaces on opposite faces of the tooth with respect to the circumferential direction of the sprocket, and a pair of discrete wear limit markers, on each of the side surfaces of one of said sprocket teeth, for indicating whether or not the sprocket teeth have reached a predetermined wear limit, said markers on each side of said one of the sprocket teeth being located adjacent, but spaced inwardly from, the respective chain roller-engaging surfaces on said one of the sprocket teeth, each said wear limit marker being disposed on an imaginary line extending in the direction of the pressure angle from a point on the sprocket pitch line at which the center of a chain roller would be located when said chain roller is engaged with, and applying a force to, said one of the sprocket teeth, and each said wear limit marker extending to predetermined limits on both sides of the imaginary line on which it is disposed.

6. A sprocket according to claim 5, in which only one of said teeth of the sprocket is provided with wear limit markers.

7. A sprocket according to claim 6, in which said sprocket has a shaft hole on said axis of rotation, said shaft hole has a keyway for locking said sprocket to a shaft extending into said shaft hole, and said one of the sprocket teeth is a tooth adjacent said keyway.

8. A sprocket according to claim 5, in which said sprocket has a shaft hole on said axis of rotation, said shaft hole has a keyway for locking said sprocket to a shaft extending into said shaft hole, and said one of the sprocket teeth is a tooth adjacent said keyway.

* * * * *